United States Patent [19]
Ekquist et al.

[11] Patent Number: 5,653,315
[45] Date of Patent: Aug. 5, 1997

[54] AUTOMATIC DAMPER SYSTEM

[75] Inventors: Alan Leslie Ekquist, Milan; Fahrey Mohammed Hammoud, Woodhaven, both of Mich.; Graham Brian Scott, Sylvania, Ohio

[73] Assignee: Monroe Auto Equipment Company, Monroe, Mich.

[21] Appl. No.: 541,288

[22] Filed: Oct. 10, 1995

Related U.S. Application Data

[63] Continuation of Ser. No. 215,303, Mar. 21, 1994, abandoned

[51] Int. Cl.⁶ ........................................ F16F 9/46
[52] U.S. Cl. ................ 188/266.4; 280/707; 280/714; 364/424.026
[58] Field of Search ................ 188/299, 322.15; 280/707, 714; 364/424.05

[56] References Cited

U.S. PATENT DOCUMENTS

| | | |
|---|---|---|
| 3,124,368 | 3/1964 | Corley et al. . |
| 3,995,883 | 12/1976 | Glaze . |
| 4,065,154 | 12/1977 | Glaze . |
| 4,313,529 | 2/1982 | Kato et al. . |
| 4,333,668 | 6/1982 | Hendrickson et al. . |
| 4,468,050 | 8/1984 | Woods et al. . |
| 4,526,401 | 7/1985 | Kakizaki et al. . |
| 4,598,929 | 7/1986 | Kumagai et al. . |
| 4,600,215 | 7/1986 | Kuroki et al. . |
| 4,620,619 | 11/1986 | Emura et al. . |
| 4,635,960 | 1/1987 | Shirakuma . |
| 4,648,622 | 3/1987 | Wada et al. . |
| 4,682,675 | 7/1987 | Eddy, Jr. . |
| 4,729,459 | 3/1988 | Inagaki et al. . |
| 4,838,574 | 6/1989 | Baraszu ........................ 280/707 |
| 4,867,475 | 9/1989 | Groves .......................... 280/707 |
| 4,890,858 | 1/1990 | Blankenship . |
| 4,923,038 | 5/1990 | Lizell . |
| 5,016,908 | 5/1991 | Athanas et al. ............... 280/707 |
| 5,350,187 | 9/1994 | Shinozaki ...................... 280/707 |
| 5,350,983 | 9/1994 | Miller et al. ............... 280/707 X |
| 5,396,973 | 3/1995 | Schwemmer et al. ..... 280/707 X |

FOREIGN PATENT DOCUMENTS

| | | |
|---|---|---|
| 0115202A1 | 8/1984 | European Pat. Off. . |
| 0166313A2 | 2/1986 | European Pat. Off. . |
| 0186908A2 | 9/1986 | European Pat. Off. . |
| 1450765 | 9/1973 | United Kingdom . |
| 112104 | 7/1983 | United Kingdom . |
| 8600212 | 11/1987 | WIPO . |
| WO8806983 | 9/1988 | WIPO . |

OTHER PUBLICATIONS

Yokoya, Yuji; Asami, Ken; and Hamajima, Toshimitsu, "Toyota Electronic Modulated Suspension (TEMS) System for the 1983 Soarer," *SAE*, International Congress & Exposition Detroit, Michigan, Feb. 27–Mar. 2, 1984.

*Primary Examiner*—Lee W. Young
*Attorney, Agent, or Firm*—Harness, Dickey & Pierce

[57] ABSTRACT

An automatic damper system for an automobile which includes a plurality of shock absorbers (10). Each of the shock absorbers (10) having a pressure cylinder (48), a first valve member (100) for establishing the first plurality of flow passages, as well as a second valve member (134) for establishing a second plurality of flow passages. In addition, each of the shock absorbers (10) include an actuator (176) for displacing the second valve member (134) with respect to the first valve member (100). Finally, the automatic damping system further includes a plurality of electronic control modules (34) each of which are able to control the displacement of one of the second valve members (134) with respect to one of the first valve members.

29 Claims, 7 Drawing Sheets

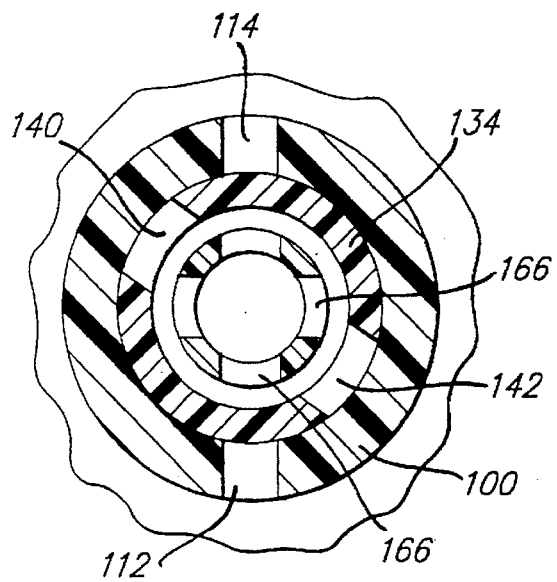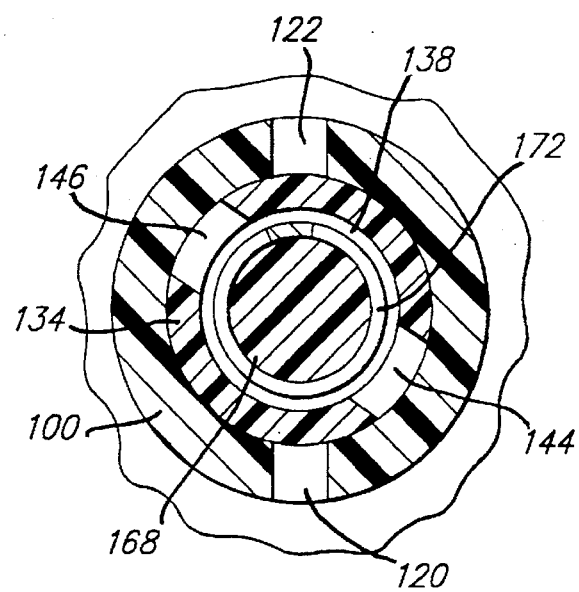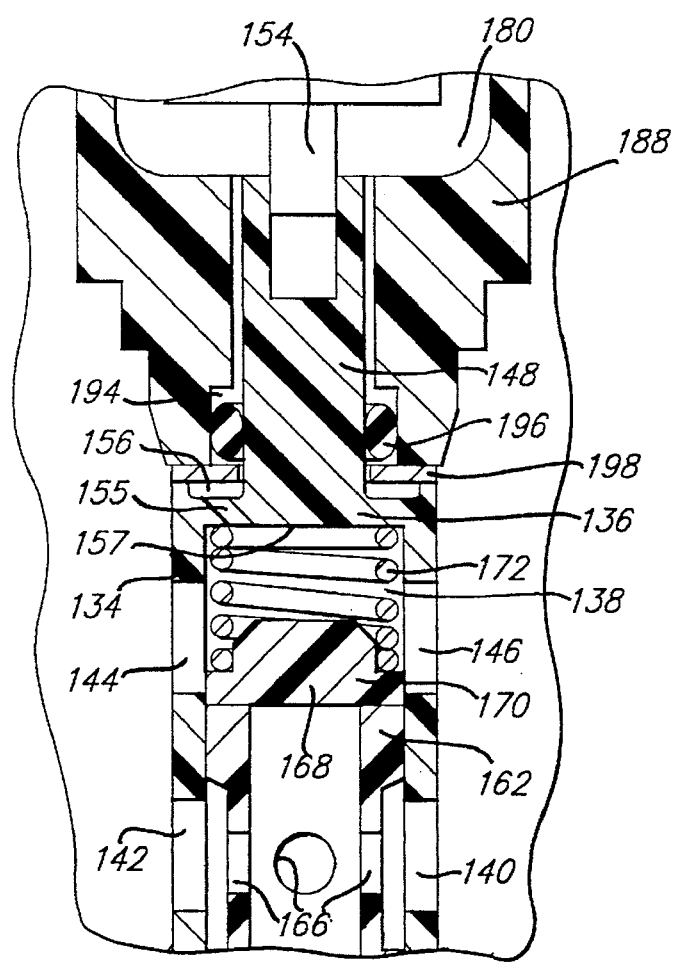

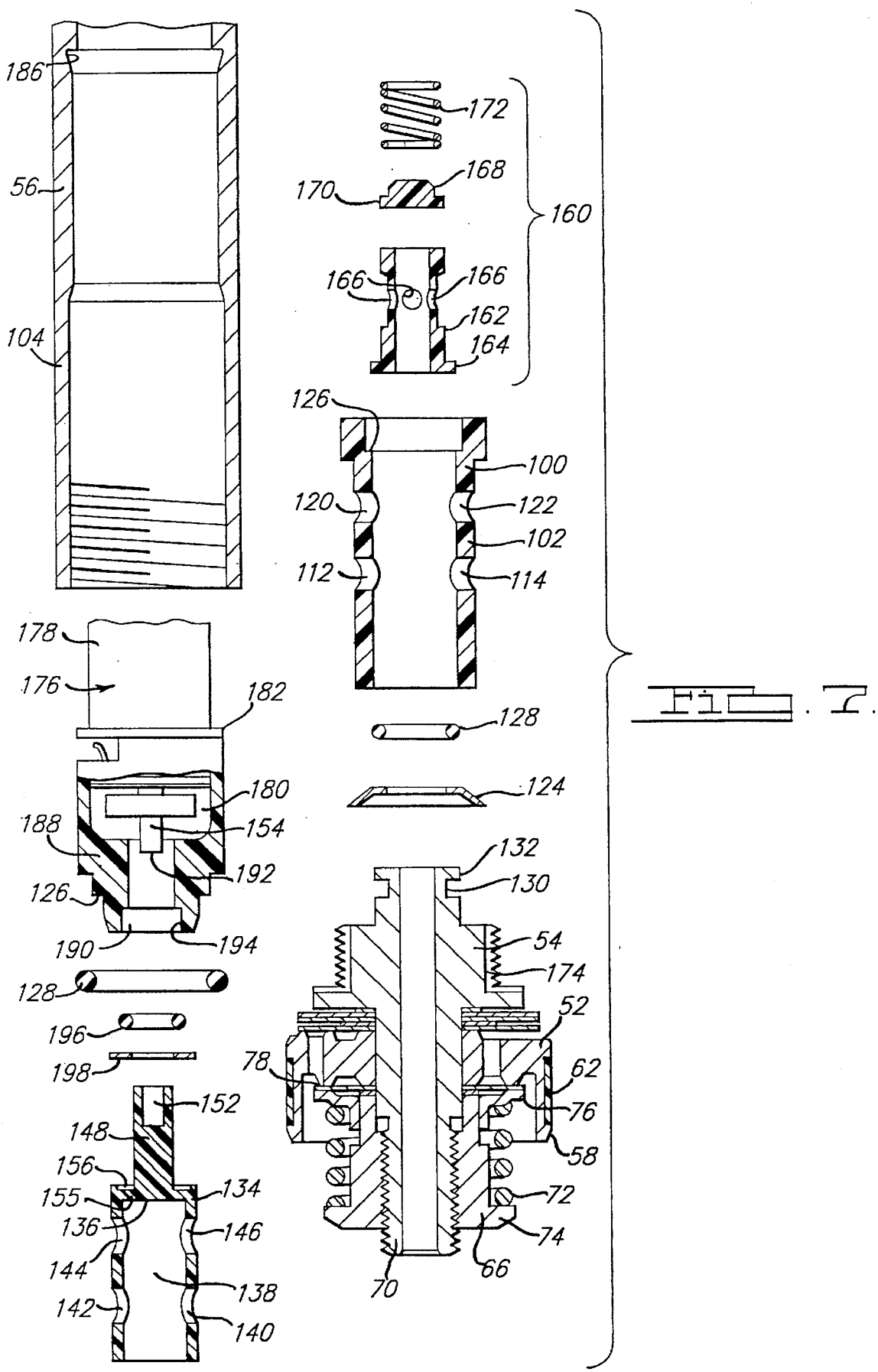

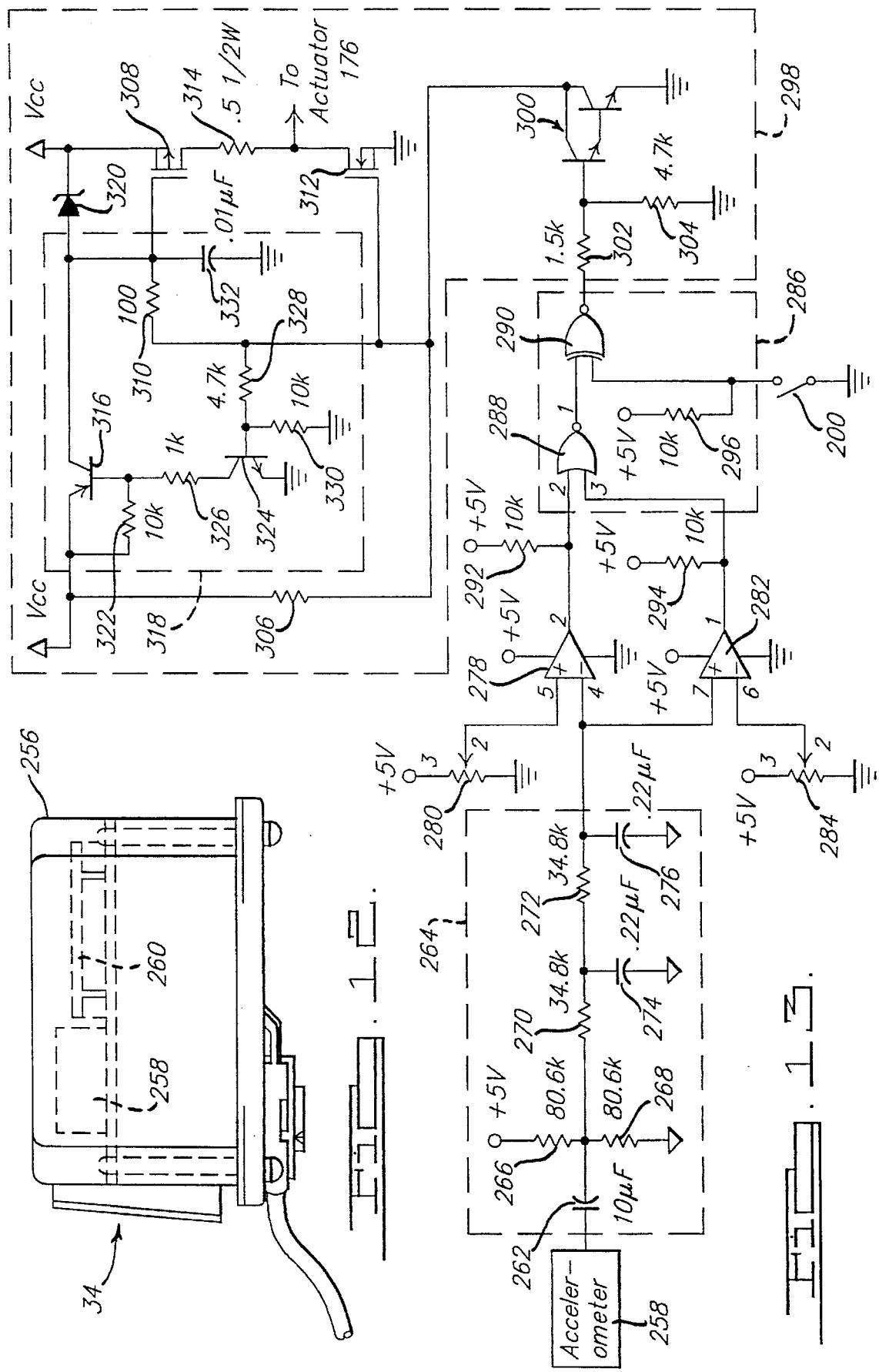

AUTOMATIC DAMPER SYSTEM

This is a continuation of U.S. patent application Ser. No. 08/215,303, filed Mar. 21, 1994, which has been expressly abandoned.

BACKGROUND OF THE INVENTION

1. Field of the Invention

This invention relates to suspension systems for automobiles and machines which receive mechanical shock, and more particularly to an automatic damper system.

2. Description of Related Art

Shock absorbers are used in connection with automotive suspension systems to absorb unwanted vibrations which occur during driving. To absorb unwanted vibrations, shock absorbers are generally connected between the body and the suspension of the automobile. A piston is located within the shock absorber and is connected to the body of the automobile through a piston rod. Because the piston is able to limit the flow of damping fluid within the working chamber of the shock absorber when the shock absorber is compressed or extended, the shock absorber is able to produce a damping force which counteracts the vibration which would otherwise be transmitted from the suspension to the body. The greater the degree to which the flow of damping fluid within the working chamber is restricted by the piston, the greater the damping forces which are generated by the shock absorber.

In selecting the amount of damping that a shock absorber is to provide, three vehicle performance characteristics are often considered: ride comfort, vehicle handling and road holding ability. Ride comfort is often a function of the spring constant of the main springs of the vehicle, as well as the spring constant of the seat, tires, and the shock absorber. Vehicle handling is related to the variation in the vehicle's attitude (i.e., roll, pitch and yaw). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability large damping forces are required when driving on irregular surfaces to prevent loss of contact between the wheels and the ground for an excessive period of time.

Because different driving characteristics depend on the amount of damping forces the shock absorber provides, it is often desirable to have a shock absorber in which the amount of damping forces generated by the shock absorber is adjustable. One method for selectively changing the damping characteristic of the shock absorber is described in U.S. Pat. No. 4,890,858. This reference discloses a rotary valve for use in controlling a shock absorber. In this regard, the shock absorber comprises a first valve member disposed within the pressure cylinder for establishing a first plurality of flow passages. The shock absorber further comprises a second valve member also disposed within the pressure cylinder for establishing a second plurality of flow passages. In addition, the shock absorber includes an actuator for providing an accelerating and a decelerating force to the second valve member. Finally, a control means for controlling displacement of the second valve member is also disclosed.

Another method for selectively changing the damping characteristics of a shock absorber is disclosed in European Patent Application Ser. No. 85116585.2. In this reference, a controller detects the distance between the body of the automobile and the front wheel so as to determine the contour of the surface. A rotary valve in each of the rear shock absorbers is then adjusted so that the rear shock absorbers are able to provide the desired amount of damping forces.

A further method for selectively changing the damping characteristics of a shock absorber is disclosed in U.S. Pat. No. 4,600,215. In this reference, an ultrasonic sensor is used to determine the vertical displacement of the vehicle body from the road surface. The output from the sensor is compared to a reference signal which is responsive to vehicle speed. The result of the comparison provides an indication of the contour of the road surface which is used by the suspension system controller to adjust a rotary valve in each of the shock absorbers.

In certain circumstances, it is desirable to have a suspension system in which a single electronic control module is able to control the damping forces generated by each of a plurality of Shock absorbers. While such a system may have certain advantages over a suspension system in which each shock absorber is independently controlled by a separate control module, such systems may not be as useful if it is desired to avoid lengthy wiring required when a single electronic control module is used. Accordingly, there are circumstances in which it is desirable to have a separate electronic control module for each shock absorber which is able to substantially adjust the damping forces associated with the shock absorber and which is not electrically connected to the other shock absorber.

SUMMARY OF THE INVENTION

Accordingly, the primary object of the present invention is to provide an automatic damping system in which each shock absorber is controlled by a devoted control module. In this regard, a related object of the present invention is to provide an automatic damping system in which the length of electrical connections between the control modules and the shock absorbers is reduced.

A further object of the present invention is to provide an automatic damper system in which the rate of damping fluid flowing between the upper and lower portions of the working chamber may be controlled with a relatively high degree of accuracy. A related object of the present invention is to provide an automatic damping system in which the amount of damping forces generated by the shock absorber can be adjusted with a relatively high degree of accuracy.

Another object of the present invention is to provide an automatic damping system in which the position of a rotary valve used for adjusting the flow of damping fluid may be controlled with a relatively high degree of accuracy.

A further object of the present invention is to provide an automatic damping system in which a braking torque may be applied by the actuator of a rotary valve so that the angular positioning of the rotary valve may be controlled with a relatively high degree of accuracy. A related object of the present invention is to provide an automatic damping system in which the coils of the actuator used for driving a rotary valve may be grounded so as to dissipate energy stored in the electromagnetic field of the actuator.

Another object of the present invention is to provide an automatic damping system in which a relatively high degree of angular deceleration may be applied to a rotary valve by the actuator. A related object of the present invention is to provide an automatic damping system in which a rotary valve used for controlling shock absorbers can quickly change the damping characteristics of the shock absorber.

A further object of the present invention is to provide an automatic damping system which is relatively inexpensive yet is able to accurately control the damping forces generated by the shock absorber.

BRIEF DESCRIPTION OF THE DRAWINGS

Various advantages of the present invention will become apparent to one skilled in the art upon reading the following specification and by reference to the following drawings in which:

FIG. 4 is a view taken in the direction of line 4—4 in FIG. 3;

FIG. 5 is a view taken in the direction of line 5—5 in FIG. 3;

FIG. 6 is a view of the upper portion of the rotary valve shown in FIG. 3;

FIG. 7 is an elevated perspective exploded view of the lower portion of the piston rod shown in FIG. 3 showing the actuator, rotary valve and piston;

FIG. 12 is a side elevational view of the electronic control module shown in FIG. 1; and FIG. 13 is a schematic diagram of one portion of the electronic control module shown in FIG. 12.

DESCRIPTION OF THE PREFERRED EMBODIMENTS

The following description of the preferred embodiment of the present invention is merely exemplary in nature and is in no way intended to limit the invention or its application or uses.

Figure 1:
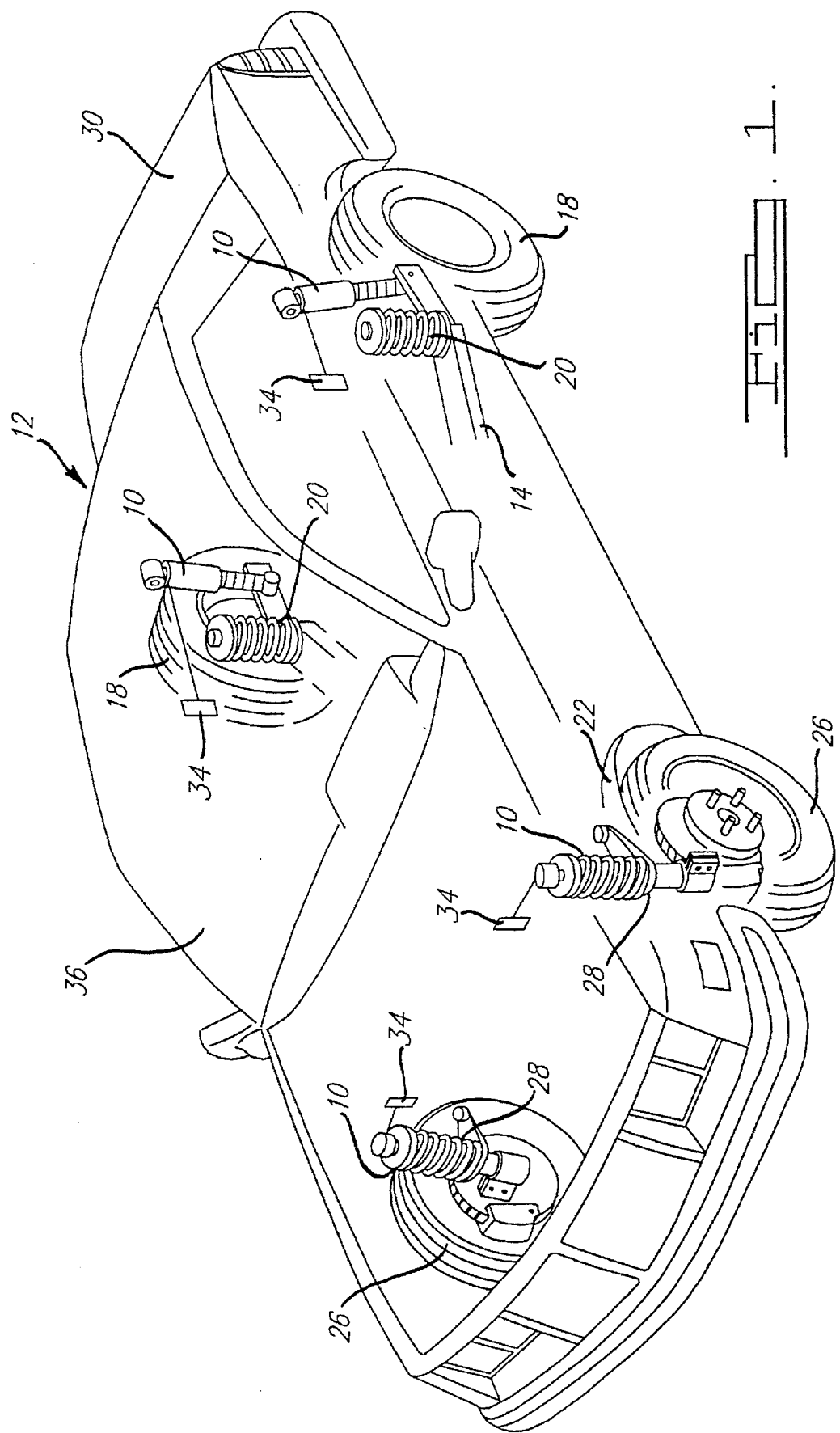
FIG. 1 is an illustration of an automobile using the automatic damping system according to the teachings of the preferred embodiment of the present invention.
Figure 2:
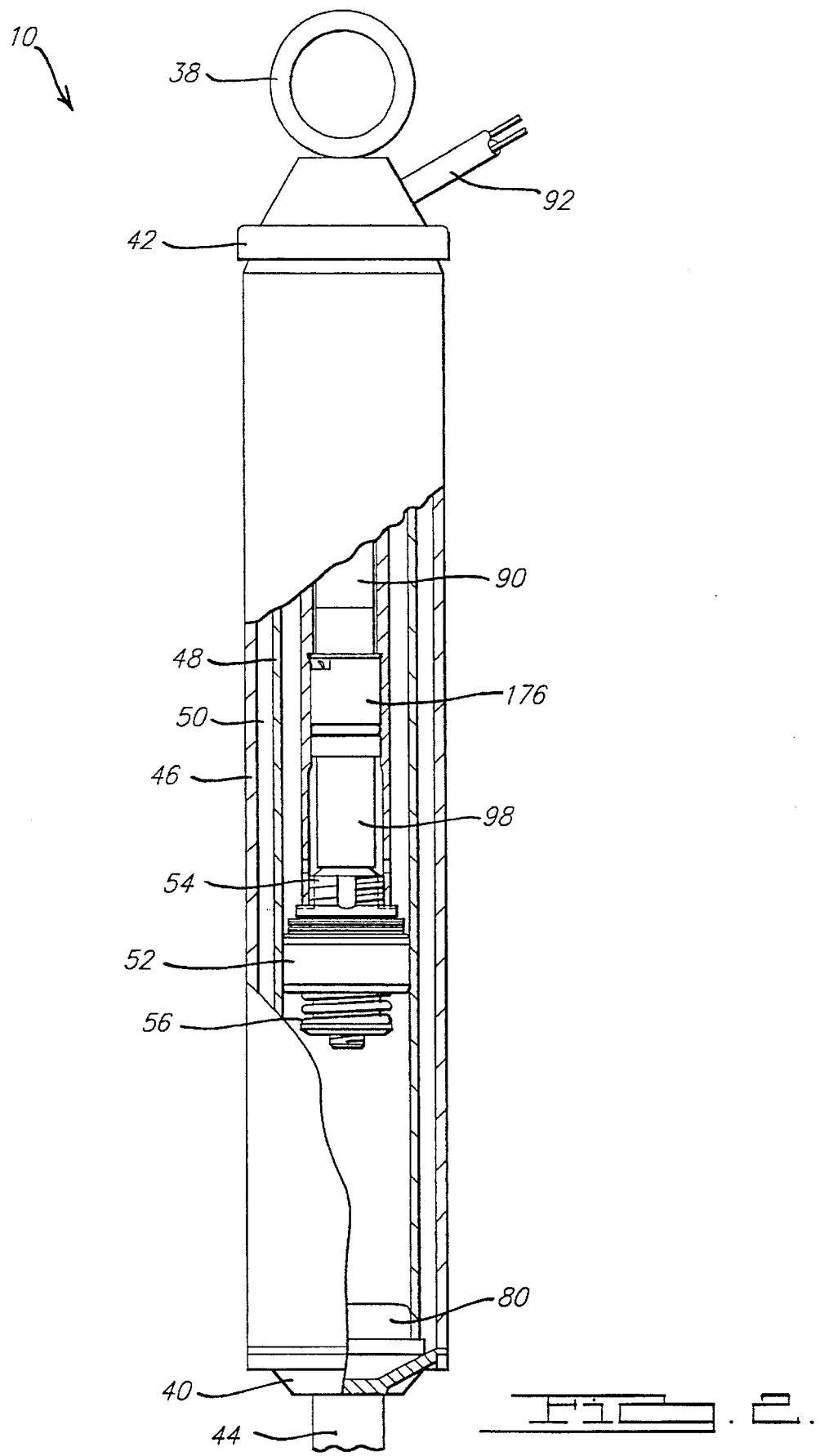
FIG. 2 is the schematic representation of the shock absorber using the automatic damping system according to the teachings of the preferred embodiment of the present invention.
Figure 3:
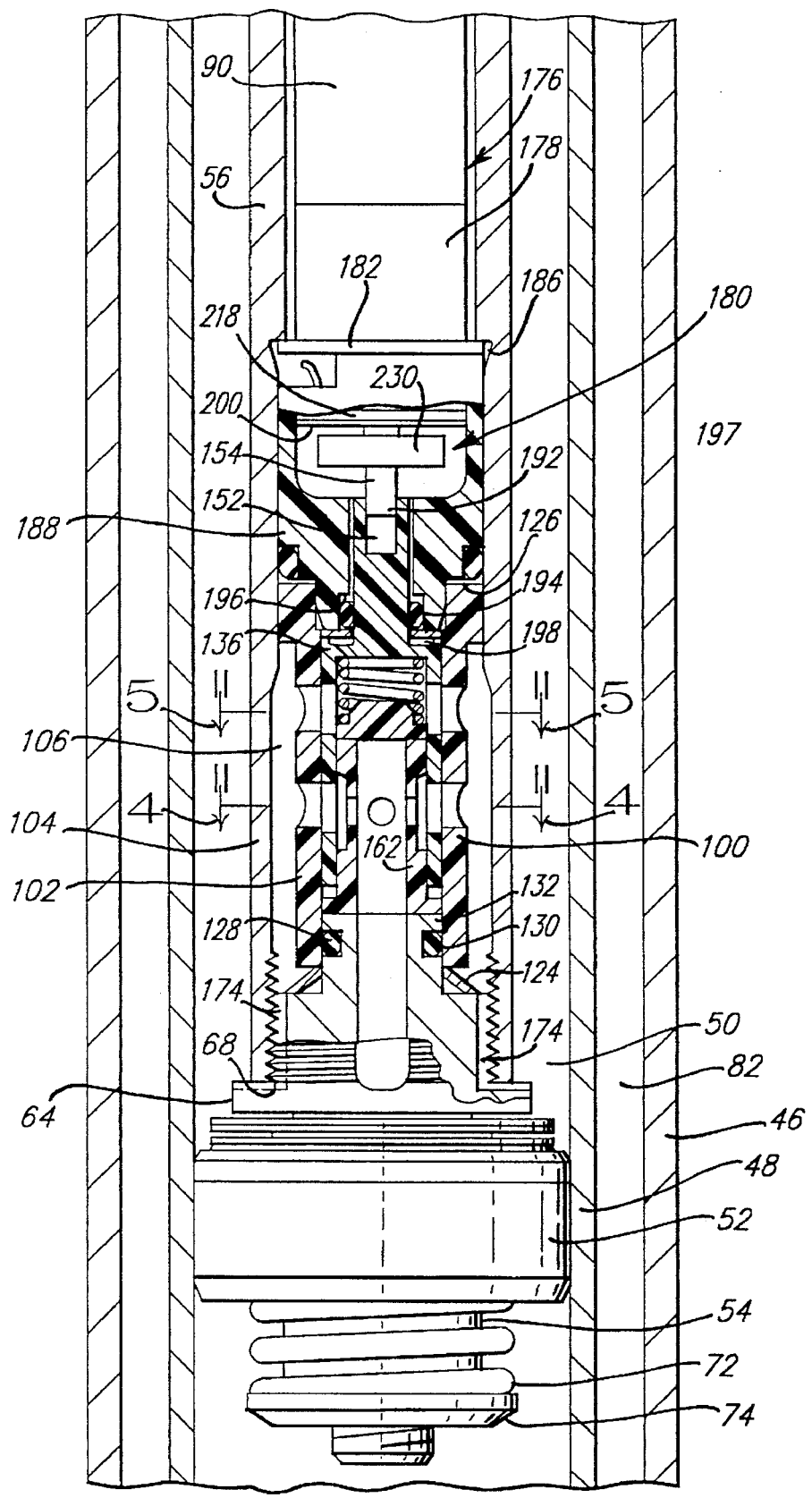
FIG. 3 is a side elevational view, partially broken away, of the lower portion of the shock absorber shown in FIG. 2.

Referring to FIG. 1, a plurality of four shock absorbers 10 according to the preferred embodiment of the present invention are shown. The shock absorbers 10 are depicted in operative association with a diagrammatic representation of a conventional automobile 12. The automobile 12 includes a rear suspension system 14 having a transversely extending rear axle assembly (not shown) adapted to operatively support the vehicle's rear wheels 18. The rear axle assembly is operatively connected to the automobile 12 by means of a pair of shock absorbers 10 as well as by the helical coil springs 20. Similarly, the automobile 12 has a front suspension system 22 including a transversely extending front axle assembly (not shown) to operatively support the front wheels 26. Front axle assembly is operatively connected to the automobile 12 by means of a second pair of shock absorbers 10 and by the helical coil springs 28. The shock absorbers 10 serve to damp the relative movement of the unsprung portion (i.e., the front and rear suspension systems 22 and 14) and the sprung portion (i.e., the body 30) of the automobile 12. While the automobile 12 has been depicted as a passenger car, the shock absorber 10 may be used with other types of automotive vehicles or in other types of applications. Further, the term "shock absorber" as used herein will refer to dampers in general and will include MacPherson struts.

To provide means for automatically adjusting the shock absorbers 10, each of these shock absorbers 10 are electrically connected to an electronic control module 34. The electronic control modules 34 are used for controlling the operation of each of the shock absorbers 10 so as to provide the appropriate damping characteristics depending on the movement of the body 30 of the automobile 12. In this regard, it is generally desirable to have soft damping when the frequency of movement of the body 30 of the automobile 12 in the vicinity of the shock absorber 10 is less than 0.4 Hz as well as above 10 Hz. Furthermore, it is generally desirable to have firm damping only when the acceleration of the body 30 of the automobile 12 in the range of the shock absorber exceeds a preselected value even when the frequency of the acceleration is between 0.4–10 Hz. Each of the electronic control modules 34 are used for generating an electronic control signal for controlling damping characteristics of the shock absorber 10 to which it is connected. In addition, each of the electronic control modules 34 are able to independently control the operation of shock absorber 10 to which it is connected without electrically interacting with the other electronic control modules 34 or the other shock absorbers 10. Accordingly, less wiring is required to provide automatic damping there if all of the shock absorbers 10 were controlled by a single electronic control module.

To secure the damper 10 to the automotive vehicle 12, the damper includes upper end fitting 38 and a lower end fitting 40. The upper end fitting 38 is connected to the upper cap portion 42 of the damper 10 by a weld. The upper end fitting 38 is in turn connected to the body 30 of the automotive vehicle 12. Similarly, the lower end fitting 40 is connected to the lower cap portion 44 of the damper 10 so as to secure the damper 10 to one of the suspension systems 14 and 22. As will be appreciated by those skilled in the art, other suitable means may be used to secure the damper 10 to the automotive vehicle 12.

The shock absorber 10 comprises an elongated tubular pressure cylinder 48 defining a damping fluid-containing working chamber 50. Disposed within the chamber 50 is a reciprocal piston 52. The reciprocal piston 52 is secured to one end of an axially extending piston post 54 which is in turn secured to an axially extending piston rod 56. As shown in FIG. 7, the piston 52 comprises a housing 58 having a plurality of ridges (not shown) disposed on the annular exterior of the piston housing 58. The ridges are used to secure an annular TEFLON sleeve 62 which is disposed between the ridges of the piston housing 58 and the pressure cylinder 48. The TEFLON sleeve 62 permits movement of the piston 52 with respect to the pressure cylinder 48 without generating undue frictional forces.

Upward movement of the piston 52 is limited by a radially extending step portion 68 of the piston post 54. Downward movement of the piston 52 is limited by a threaded nut 66 or similar type fastening element which is threadably received upon the lower portion 70 of the piston post 54. A helical coil spring 72 is arranged concentrically of the nut 66 and is supported at the lower end thereof by a radially outwardly extending flange 74 on the lower end of the nut 66. The upper end of the spring 72 bears against a spring retainer 76 which in turn acts against the underside of a valve disk 78 to thereby resiliently urge the valve disk 78 into sealing engagement with the piston housing 58. A further explanation of the construction and operation of the piston is disclosed in U.S. Pat. No. 4,113,072, which is hereby incorporated by reference.

A base valve, generally designated by the numeral 80, is located within the lower end of the pressure cylinder 48 and is used to control the flow of damping fluid between the working chamber 50 and an annular fluid reservoir 82. The annular fluid reservoir 82 is defined as the space between the outer periphery of the pressure cylinder 48 and the inner periphery of the housing 46. The operation of the base valve 80 may be similar to the operation of the base valve shown in U.S. Pat. No. 3,757,910, which is hereby incorporated by reference. However, other types of base valves may be used.

The damper 10 further includes a connector (not shown) which is disposed within the upper cap portion 42 of the damper 10. The connector is used to provide electrical communication between the flex cable 90 which is connected to the actuator described below and the cables 92 leading to the electronic control module 34 associated with the damper 10. While the connector 88 may be that which is available from Pave Technology, other suitable connectors may be used.

In addition, the shock absorber 10 also comprises generally cup-shaped upper and lower end caps 94 and 96 respectively. The upper and lower end caps 94 and 96 are secured to opposing ends of the housing 46 by a suitable means such as welding. The upper and lower end caps 94 and 96 are used to seal the ends of the pressure cylinder 48.

To provide means for regulating the flow of damping fluid between the upper and lower portions of the working chamber 50, a rotary valve 98 is provided. The rotary valve 98 controls the flow of damping fluid between the upper and lower end portions of the working chamber 50 which bypasses the piston 52. Accordingly, when a firm compression and rebound stroke is desired, the rotary valve 98 may be closed so as to permit damping fluid to flow only through the piston 52. When a soft compression and rebound stroke is desired, the rotary valve 98 is opened so that the amount of damping fluid flowing between the upper and lower portions of the working chamber 50 may be increased. The amount of damping fluid flowing through the rotary valve 98 is adjusted by an actuator described below which in turn is electrically controlled by the electronic control module 34.

The rotary valve 98 comprises an annular orifice sleeve 100 which is coaxially disposed within the piston rod 56. The lower end portion of the orifice sleeve 100 has a reduced diameter section 102 which mates with an increased internal diameter section 104 of the piston rod 56 so as to form a cavity 106 therebetween. Fluid from the upper portion of the working chamber 50 is able to flow into and out of the cavity 106 by means of a plurality of four flow passages 174 which are located on the periphery of the upper portion of the piston post 54. To support the orifice sleeve 100 in an upward direction, a disk-shaped spring 124 is provided. The spring 124 is disposed between the lower portion of the orifice sleeve 100 and the upper portion of the piston post 54 so as to bias the orifice sleeve 100 in an upward direction. The orifice sleeve 100 also has a step 126 which engages the sensor housing of the actuator described below so as to limit upward movement of the orifice sleeve 100. Damping fluid is prevented from flowing between the orifice sleeve 100 and the piston post 54 by an annular retaining seal 128. The annular retaining seal 128 is disposed within an annular groove 130 in an axially extended portion 132 of the piston post 54.

The orifice sleeve 100 has a plurality of flow passages 112–114 and 120–122. The centers of the flow passages 112 and 114 are disposed on a plane which is perpendicular to the axis of the orifice sleeve 100. Further, the flow passages 120 and 122 are axially displaced from the flow passages 112 and 114 and are disposed on a plate which is perpendicular to the axis of the orifice sleeve 100. The flow passages 112 and 114 are substantially identical and are spaced 180° apart. Similarly, the flow passages 120 and 122 are also substantially identical and are spaced 180° apart. In addition, the flow passages 120 and 122 have a diameter which is preferably the same as or larger than the diameter of the flow passages 112 and 114. Because of their relatively large diameter, a soft rebound and compression stroke is generated by the shock absorber 10 when damping fluid is flowing through the flow passages 112, 114, 120 and 122. When damping fluid is not flowing through any of the flow passages 112–114 and 120–122 in the orifice sleeve 100, a firm compression and rebound stroke is generated since the flow of damping fluid is regulated only by the piston 52.

To control the flow of damping fluid flowing through the flow passages 112–114 in the orifice sleeve 100, the rotary valve 98 further comprises an annular shutter sleeve 134 with a closed upper end portion 136 and a central bore 138. The shutter sleeve 134 is disposed coaxially within the orifice sleeve 100, with the radially outer surface of the shutter sleeve 134 being adjacent to the radially inner surface of the orifice sleeve 100. The shutter sleeve 134 has a plurality of flow passages 140–146. The flow passages 140 and 142 are disposed symmetrically about a plane passing axially through the center of the shutter sleeve 134, while the flow passages 144 and 146 are disposed symmetrically about a plane passing axially through the center of the shutter sleeve 134. The centers of the flow passages 140 and 142 lie within the plane established by the centers of the flow passages 112 and 114 in the orifice sleeve 100. Similarly, the center of the flow passages 144 and 146 lies within the plane established by the centers of the flow passages 120 and 122 in the orifice sleeve 100. As will be more thoroughly discussed below, rotation of the shutter sleeve 134 controls the flow of damping fluid through the flow passages 140–146 of the shutter sleeve 134 and the flow passages 112–114 and 120–122 in the orifice sleeve 100.

When the shutter sleeve 134 is rotated such that the flow passages 140–146 in the shutter sleeve 134 are aligned with the flow passages 112, 114, 120 and 122 in the orifice sleeve 100, damping fluid is able to flow between the upper and lower portions of the working chamber 50 through the flow passages 140–146 and the flow passages 112, 114, 120 and 122. Because the flow passages 112, 114, 120 and 122 in the orifice sleeve 100 are relatively large, a soft compression and rebound stroke is generated. When the shutter sleeve is rotated further such that the flow passages 140–146 in the shutter sleeve 134 are not aligned with any of the flow passages 112–114 and 120–122 in the orifice sleeve 100, damping fluid is unable to flow through the rotary valve 98. Accordingly, the flow of damping fluid between the upper and lower portions of the working chamber 50 is governed by the piston 52 which provides a firm damping characteristic as discussed above. It will be noted that the flow passages 120 and 122 in the orifice sleeve 100 and the flow passages 144 and 146 in the shutter sleeve 134 are used in conjunction with a check valve described below.

The shutter sleeve 134 further comprises an axially extending projection 148 disposed on the closed upper end portion 136 of the shutter sleeve 134 having a downwardly extending slot 152. The projection 148 extends in the direction towards the upper portion of the working chamber 50 and is used to engage the shaft 154 of the actuator described below which is used to rotate the shutter sleeve 134. By rotating the shutter sleeve 134, the flow passages 140–146 in the shutter sleeve 134 are able to selectively mate with the flow passages 112–114 and 120–122 in the orifice sleeve 100 so that the flow of damping fluid between the upper and lower portions of the working chamber 50 can be controlled.

To provide means for generating a soft compression stroke relative to the rebound stroke, a check valve 160 is provided. The check valve 160 comprises an annular check valve sleeve 162 which is located coaxially within the central bore 138 of the shutter sleeve 134. The lower portion of the check valve sleeve 162 has a radially extending flange 164 which abuts the upper portion of the piston post 54. The check valve sleeve 162 extends from the piston post 54 in a direction towards the upper portion of the working chamber to a point just below the flow passages 144–146 in the shutter sleeve 134. The check valve sleeve 162 has a plurality of radially extending flow passages 166, the centers of which occupy a plane which is coplanar with the plane established by the centers of the flow passages 120–122 in the orifice sleeve 100. Accordingly, damping fluid is able to flow between the upper and lower portions of the working chamber 50 through the flow passages 166 in the check valve sleeve 162 and the flow passages 120–122 in the orifice sleeve 100 when the flow passages 144–146 in the shutter sleeve 134 are aligned with the flow passages 120–122 in the orifice sleeve 100.

The check valve 160 further comprises a closure member 168 which is located within the central bore 138 of the shutter sleeve 134 and is disposed coaxially with respect to the check valve sleeve 162 at the upper end portion thereof. The closure member 168 has a radially extending flange 170 which is able to mate with the upper end portion of the check valve sleeve 162. When the closure member 168 is mated to the upper end portion of the check valve sleeve 162, damping fluid is unable to flow between the upper and lower portions of the working chamber 50 through the flow passages 120–122 of the orifice sleeve 100 as well as the flow passages 144 and 146 of the shutter sleeve 108. However, when the closure member 168 is displaced from the upper surface of the check valve sleeve 162, damping fluid is able to flow between the upper and lower portions of the working chamber 50 through the check valve 160 by way of the flow passages 120–122 of the orifice sleeve 100, and the flow passages 144 and 146 of the shutter sleeve 134.

To bias the closure member 168 against the upper end portion of the check valve sleeve 162, a spring 172 is provided. The spring 172 is disposed within the central bore 138 of the shutter sleeve 134 between the closed upper end portion 136 of the shutter sleeve 134 and the flange 170 of the closure member 168. When the pressure in the lower portion of the working chamber 50 exceeds the pressure in the upper portion of the working chamber 50 so as to overcome the force exerted on the closure member 168 by the spring 172, the damping fluid in the lower portion of the working chamber 50 causes the closure member 168 to compress the spring 172. As the spring 172 is compressed, damping fluid within the check valve sleeve 162 is able to flow from the check valve sleeve 162 through the flow passages 144 and 146 in the shutter sleeve 134 and the flow passages 120–122 in the orifice sleeve 100 into the cavity 106 when the flow passages 120–122 are aligned with the flow passages 144 and 146. The damping fluid in the cavity 106 is then able to flow to the upper portion of the working chamber 50 through the flow passages 174 in the piston post 54 so as to produce a relatively soft compression stroke.

During rebound, the spring 172 causes the closure member 168 to be displaced towards the upper end portion of the check valve sleeve 162 so as to prevent damping fluid in the upper portion of the working chamber 50 to flow to the lower portion of the working chamber 50 through the flow passages 120–122 in orifice sleeve 100 and the flow passages 144–146 in the shutter sleeve 134. Accordingly, a relatively firm rebound stroke is produced by the check valve 160.

From the discussion above, it will be seen that the forces acting on the shutter sleeve 134 are balanced. For example, forces exerted on the shutter sleeve 134 by the damping fluid flowing through the flow passages 112 and 120 are balanced by the flow of damping fluid flowing through the flow passages 114 and 122. Further, the force exerted on the closed upper end portion 136 of the shutter sleeve 134 by the damping fluid in the central bore 138 is balanced by the force exerted by the pressure of the damping fluid within the annular recess 156 which is received from the central bore 138 through the flow passage 155. In addition, the shutter sleeve 134 and the check valve sleeve 162 are rotationally independent so that the forces acting on the check valve 160 are not transmitted to the shutter sleeve 134. Because the forces acting on the shutter sleeve 134 are balanced, the actuator described below is able to rotate the shutter sleeve 134 without encountering excessive frictional forces. Because the actuator is therefore able to rotate the shutter sleeve at a greater angular velocity, the actuation time of the rotary valve 98 is decreased. Further, the expected longevity of the rotary valve 98 as well as the actuator are increased as less mechanical stress acts upon the rotary valve 98 and the actuator 176.

To drive the rotary valve 98, an actuator 176 is provided which is coaxially disposed within the piston rod 56. The actuator 176 is used for rotating the shutter sleeve 134 so that the rotary valve 98 may control the flow of damping fluid between the upper and lower portions of the working chamber 50. The actuator 176 has a motor/gear portion 178 and a sensor portion 180 which are separated by a circular support plate 182 which is secured to the motor/gear portion 178 by a plurality of screws (not shown). The circular support plate 182 abuts a step 186 in the piston rod 56 so as to prevent upward movement of the actuator 176. In addition, the sensor portion 180 comprises a sensor housing 188 that abuts the step 126 in the orifice sleeve 100 to prevent downward movement of the actuator 176. The sensor housing 188 has an aperture 190 which is used to receive the projection 148 of the shutter sleeve 134 as well as a shaft 154 from the actuator 176. The shaft 154 of the actuator 176 has a rectangular end portion 192 which is able to be received by the slot 152 in the projection 148. Accordingly, rotation of the shaft 154 causes rotation of the projection 148 and hence the shutter sleeve 134. The sensor housing 188 further has a recess 194 at its lower end portion which is able to receive an annular retaining seal 196. The annular retaining seal 196 is disposed within the recess 194 to prevent damping fluid to flow between the sensor housing 188 and the projection 148 of the shutter sleeve 134. Further, an annular retaining seal 197 is located adjacent to the interior surface of the piston rod 56 between the sensor housing 188 and the orifice sleeve 100 so as to prevent damping fluid from flowing therebetween. An annular disk 198 is disposed between the sensor housing 188 and the upper closed end portion 136 of the shutter sleeve 134 so as to limit upward movement of the shutter sleeve 134. While the actuator 176 may be manufactured by Copal Co., Ltd., other suitable actuators may be used.

Figures 10, 11:
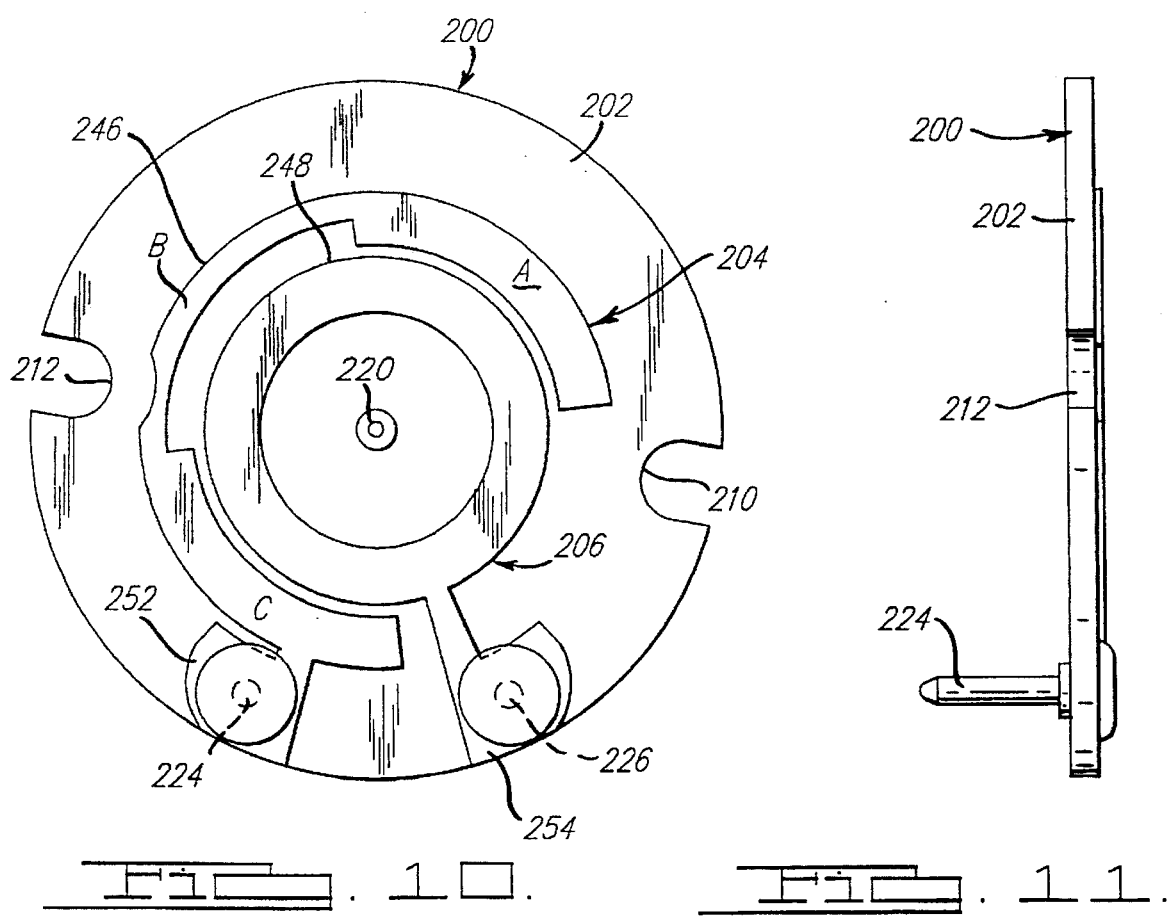
FIGS. 10 and 11 are enlarged views of the encoder disk shown in FIG. 3.

To encode the angular position of the shutter sleeve 134, the actuator 176 further comprises a circular encoder disk 200 as shown in FIGS. 10 and 11. The encoder disk 200 has a planar substrate 202 and a plurality of etched conductors 204 and 206 disposed thereon. The substrate 202 has two radially inward extending indented regions 210 and 212 on its periphery which are used to receive a plurality of screws (not shown) which secure the encoder disk 200 to a plurality of axially extending projections (not shown) disposed on the circular support plate 182. A circular backing plate 218 is disposed between the projections on the support plate 182 and the encoder disk 200 to support the encoder disk 200. The encoder disk 200 further includes a centrally located aperture 220, which is able to receive the shaft 154 of the actuator 176, as well as a plurality of peripherally disposed pins 224 and 226. The pins 224 and 226 are located perpendicular to the plane established by the substrate 202 and electrically communicate with a flex cable 90 which is used to electrically connect the encoder disk 200 to the connector 88.

Figures 8, 9:
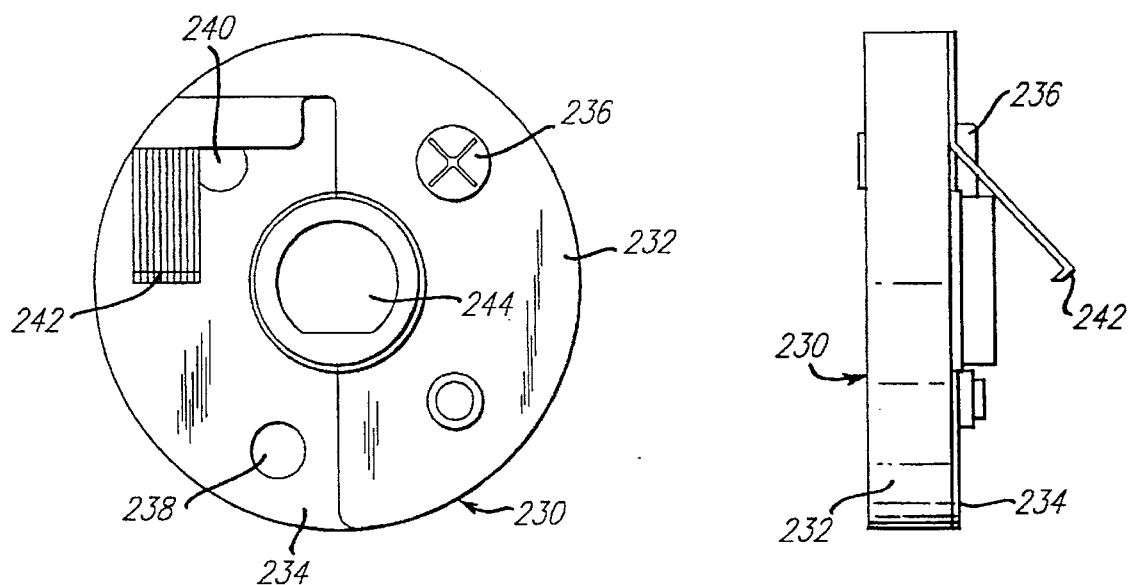
FIGS. 8 and 9 are enlarged views of the brush disk shown in FIG. 3.

The encoder disk 200 is used in conjunction with a brush disk 230 to electrically indicate the position of the shutter sleeve. As shown in FIGS. 8 and 9, the brush disk 230 comprises a disk-shaped substrate 232 with a conductor 234 disposed thereon. The conductor 234 is secured to the substrate 232 of the brush disk 230 by a screw 236 and the locating pins 238 and 240 which are disposed on the substrate 232 and engage holes in the conductor 234. The conductor 234 includes an axially extended brush portion 242 which is able to mate with the conductors 204 and 206 on the encoder disk 200 in the manner described below. The brush disk 230 further comprises a centrally located aperture 244 which is able to receive the shaft 154 of the actuator 176.

The brush portion 242 and the conductors 204 and 206 are so arranged that when the brush portion 242 contacts the encoder disk 200 in the manner described below, the relative potentials of the conductors 204 and 206 may be used to determine whether the flow passages 140–146 in the shutter sleeve 134 are mated to the flow passages 112, 114, 120 and 122 (producing a soft rebound and compression stroke. Or to determine whether there is no alignment between the flow passages 140–146 in the shutter sleeve 134 and the flow passages 112–114 and 120–122 in the orifice sleeve 100 (producing a firm rebound and compression stroke).

As shown in FIGS. 10 and 11, the conductors 204 and 206 of the encoder disk 200 have concentric portions 246 and 248 and a radially extending portion 252 and 254. The radially extending portions of 252 and 254 of the conductors 204 and 206 electrically communicate with the pins 224 and 226 respectively. The concentric portion 248 of the conductor 206 is located closest to the aperture 220, while the concentric portion 226 of the conductor 204 is disposed further from the aperture 220 than the concentric portion 248 of the conductor 206.

The concentric portion 246 of the conductor 204 comprises regions A, B and C. The radially inwardmost edge of the regions A and C are radially closer to the aperture 220 than the radially innermost edges of the region B and F. In addition, the radially outwardmost edge of the regions A–C are substantially the same radial distance from the aperture 220. Because the brush portion 242 of the brush disk 230 is only able to contact the conductor 204 at regions A and C, the encoder disk 200 is able to indicate the transitions in damping characteristics in the manner described below.

When the brush portion 242 of the brush disk 230 is located on the region A of the conductor 204, the brush permits electrical communication between the conductor 204 and the conductor 206. Because the conductor 206 is grounded, the voltage at the conductor 204 goes to ground potential. The electronic control module 34 interprets the ground potential appearing on the conductor 204 in the manner described below as indicating that the shutter sleeve 134 has rotated to a position which will provide a soft compression and rebound stroke.

As the brush portion 242 rotates further in a counterclockwise direction to region B of the conductor 204, contact between the brush portion 242 and the conductor 204 terminates which is interpreted by the electronic control module 34 as having the shutter sleeve 134 adjusted to provide a firm compression and rebound stroke. As the brush portion 242 rotates further in a counterclockwise direction so as to cause electrical communication between region A of the conductor 204 and the conductor 206, the voltage appearing on the conductor 204 goes to ground potential. The electronic control module 34 interprets ground potential appearing on the conductor 204 as indicating that the shutter sleeve 134 has rotated to a position which will provide a soft compression and rebound stroke as discussed above. Further rotation of the brush disk 230 in a counterclockwise direction by the shaft 154 causes the brush portion 242 to terminate contact between the conductor 204 and the conductor 206, which is interpreted by the electronic control module 34 as indicating that the shutter sleeve 134 is adjusted to provide a firm compression and rebound stroke. Further rotation of the brush disk 230 causes the brush portion 242 to contact region A of the conductor 204 which causes the electronic control module 34 to adjust the shock absorber 10 in the manner described above.

The electronic control module 34 comprises a housing 256 which is fixedly secured to the automobile 12. Within the housing 256 of the electronic control module 34 is an accelerometer 258 as well as a circuit board 260 for containing the electronic components described below. The accelerometer 258 is able to measure the acceleration of the electronic control module 34, while the components on the circuit board 260 are used for processing the output of the accelerometer 258 so as to provide electronic control signals for controlling the damping characteristics of the shock absorber 10 in the manner described below. The electronic control module 34 electrically communicates with the ignition system of the automobile 12 which provides the necessary power for operating the electronic control module 12 as well as the shock absorber 10. While the electronic control module 34 may be connected to the upper surface of the fender well of the automobile 12 in a region proximate to the shock absorber 10, it will be understood that the electronic control module 34 may be located at other suitable positions within the automobile 12 as well.

As discussed above, the accelerometer 258 is used to sense the vertical movement of the electronic control module 34 and generate an output indicative of this vertical movement. The output from the accelerometer 250 is delivered to the circuit board 260, the components of which will now be described. In particular, the output of the accelerometer 258 is delivered to a first plate of a capacitor 262 of a filter 264. The capacitor 262 functions as a coupling capacitor and provides high-pass filtering for the output of the accelerometer 258 so as to attenuate signals below approximately 0.4 Hz. The second plate of the capacitor 262 is connected to one lead of the resistor 266 as well as the resistor 268. The second lead of the resistor 266 is connected to a 5-volt supply source, while the second lead of the resistor 268 is connected to ground. The resistors 266 and 268 are used to establish a bias of approximately 2.5 volts upon which the signal from the accelerometer 258 is superimposed.

The second plate of the capacitor 262 is also connected to a low-pass filtering portion of the filter 264 which includes the resistors 270 and 272 as well as the capacitor 274 and 276. One lead of the resistor 270 is connected to the second plate of the capacitor 262, while the second lead of the resistor 270 is connected to the first plate of the capacitor 274 as well as the first lead of the resistor 272. The second lead of the capacitor 274 is connected to ground, while the second lead of the resistor 272 is connected to the first lead of the capacitor 276, the second lead of which is connected to ground. When the resistors 270 and 272, as well as the capacitor 274 and 276, are connected in this manner, they serve as a second order low-pass filter which attenuates signals that are generated by the accelerometer 258 which have the frequency of generally greater than 10 Hz.

To provide means for determining whether the output from the accelerometer 258 exceeds a positive acceleration threshold, a first comparator 278 is provided. The inverting input of the first comparator 278 is connected to the second lead of the resistor 272, while the non-inverting input of the first comparator 278 is connected to the movable connector of a first variable resistor 280 so as to create a reference signal. As those skilled in the art will appreciate, when the reference signal delivered to the non-inverting pin of the first comparator 278 exceeds the signal from the accelerometer 258 which is delivered from the inverting pin 4, the output of the first comparator 278 becomes logically high. While the first comparator 278 may be a portion of a LM2901 quad comparator, though other suitable comparators may be used.

To provide means for determining whether the output of the accelerometer 258 exceeds the negative acceleration threshold, a second comparator 282 is provided. The non-inverting input pin 7 of the second comparator 282 is connected to the output of the accelerometer 258 through the capacitor 262 as well as the resistors 270 and 272. In addition, the inverting input of the second comparator 282 is connected to the movable contact of a second variable resistor 284. The V$^+$ pin 3 of the second comparator 282 is connected to a 5-volt supply, while the GND pin 12 of the second comparator 282 is connected to ground. Again, as those skilled in the art will appreciate, when the input to the non-inverting input pin 7 received from the accelerometer 258 through the capacitor 262 as well as the resistors 270 and 272 is greater than the output delivered to the non-inverting pin 6 of the second comparator 282 from the second variable resistor 284, the output of the second comparator 282 at pin 1 goes logically high. The second comparator 282 may also be a portion of a LM2901 quad comparator, though other suitable comparators may be used.

Because the voltage of the movable contact of the variable resistor 280 may be changed, the positive acceleration threshold may be adjusted so as to change when the firm damping characteristics are generated by the shock absorber 10. That is, the greater the voltage which is delivered to the non-inverting input pin 5 from the variable resistor 280, the larger the positive acceleration threshold becomes. Similarly, the larger the voltage which delivered from the movable contact of the second variable resistor 284 to the inverting input pin 6 of the second comparator 282, the larger the negative threshold will become. One end to connection of each of the variable resistors 280 and 284 are connected to the 5-volt supply, while the other end of connectors of each of the variable resistors 280 and 284 are connected to ground.

To provide means for driving the actuator 176 in response to the output from the first and second comparators 278 and 282, a logic circuit 286 is provided. The logic circuit 286 comprises an AND gate 288 as well as an exclusive OR gate 290. The input pin 2 of the AND gate 288 receives the output from output pin 2 of the first comparator 278. Input pin 2 of the AND gate 288 is also connected to one lead of the pull-up resistor 292, the other lead of which is connected to the 5-volt supply. Similarly, the input pin 3 of the AND gate 288 is connected to the output pin 1 of the second comparator 282. In addition, the input pin 3 of the AND gate 288 is also connected to one lead of the pull-up resistor 294, the other lead of which is connected to the 5-volt supply. Accordingly, when the outputs from both of the comparators 278 and 282 are logically low, the output of the AND gate 288 is logically low. When either of the outputs of the comparators 278 and 282 are logically high, the output of the AND gate 288 is logically low.

The output pin 1 of the AND gate 288 is connected to a first input of the exclusive OR gate 290. The second input of the exclusive OR gate 290 is connected to the encoder disk 200. In addition, the second input of the encoder disk 200 is connected to one lead of a pull-up resistor 296, the other lead of which is connected to a five-volt supply. As discussed above, if the output of the accelerometer 258 is such that if either of the inputs to the inverting pin of the first comparator 278 or the non-inverting pin of the second comparator 282 exceeds either the positive or negative threshold settings respectively, the output of the AND gate 288 will be logically low, thus indicating a firm damping characteristic is desired. If the encoder disk 200 is positioned such that the shock absorber 10 is providing soft damping characteristics, the output from the exclusive OR gate 290 will become logically high which will cause the actuator 176 to rotate in a manner described below so as to produce firm damping. Alternatively, if the encoder disk 200 is already positioned such that the shock absorber 10 is providing firm damping characteristics, the output from the exclusive OR gate 290 will be logically low indicating that firm damping characteristics are already being generated and therefore no movement of the actuator 176 is required.

In a similar fashion, if the output of the accelerometer 258 is such that the acceleration of the electronic control module 34 is either greater than 10 Hz or less than 0.4 Hz, or if the magnitude of the acceleration is within the positive and negative threshold settings, the output of the AND gate 288 will be logically high, thus indicating that a soft damping characteristic is desired. If the encoder disk 200 is positioned such that the shock absorber 10 is providing firm damping characteristics, the output from the exclusive OR gate 290 will become logically high which will cause the actuator 176 to rotate in a manner described below so as to produce soft damping. However, if the encoder disk 200 is already positioned such that the shock absorber 10 is providing soft damping characteristics, the output from the exclusive OR gate 290 will be logically low, indicating that soft damping characteristics are already being generated and therefore no movement of the actuator 176 is required.

To provide means for driving the actuator 176 in response to the output of the logic circuit 286, the electronic control module 34 further includes a driving circuit 298. The driving circuit 298 is used for energizing the actuator 176 when the logic circuit 286 determines that the actuator 176 should be driven. The driving circuit 298 comprises a Darlington transistor 300 which is used to control the drive transistors which are described below. The base of the transistor 300 is connected to one lead of a current limiting resistor 302, the other lead of which is connected to the exclusive OR gate 290. In addition, the base of the transistor 300 is also connected to one lead of a biasing resistor 304, the other lead of which is connected to ground. The collector of the transistor 300 is connected to $V_{cc}$ through the resistor 306, which is nominally 13.2 volts. In addition, the emitter of the transistor 300 is connected to ground. As those skilled in the art will recognize, a relatively high voltage delivered to the base of the transistor 300 will cause the transistor 300 to conduct, thereby reducing the voltage at the collector of the transistor 300.

The collector of the transistor 300 is connected to the base of a first field-effect transistors 308 through a resistor 310 as well as to the base a second field-effect transistor 312. The transistor 308 is used for supplying current to the actuator 176, while the transistor 312 is used for grounding the coils of the actuator 176. As those skilled in the art will appreciate, connecting the coils of the actuator 176 to ground will cause the residual EMF in the coils of the actuator 176 to effectively brake rotational movement of the actuator 176.

The drain of the transistor 308 is connected to $V_{cc}$, while the source of the transistor 308 is connected to the drain of the transistor 312 through the resistor 314. In addition, the source of the transistor 312 is connected to ground, while the gate of the transistor 308 is connected to $V_{cc}$ through the transistor 316. The gate of the transistor 308 also is connected to ground through the capacitor 318. As those skilled in the art will appreciate, when the output of the logic circuit 286 is logically high, the voltage delivered to the gate of the transistor 312 is relatively low thereby preventing the transistor 312 from conducting. Accordingly, when the voltage at the collector of transistor 300 is relatively low, the voltage delivered to the gate of the transistor 308 through the transistor 316 is relatively high as discussed below. Under these circumstances, the transistor 308 is brought into conduction thereby causing a relatively large current to be delivered to the actuator 176. When the output of the logic circuit 286 is logically low, the voltage at the collector of the transistor 300 is relatively high. This relatively high voltage causes the transistor 312 to conduct, thereby producing a low voltage at the drain of the transistor 312 which is insufficient to cause the actuator 176 to rotate.

To provide means for insuring that the transistors 308 and 312 do not conduct simultaneously, a lock-out circuit 318 is provided. The lock-out circuit 318 comprises the transistor 316 having an emitter which is coupled to $V_{cc}$ and a collector connected to an overvoltage protection diode 320. The base of the transistor 316 is connected to the emitter of the transistor 316 through the resistor 322 and is also connected to the collector of the transistor 324 through the resistor 326. The emitter of the transistor 324 is connected to ground, while the base of the transistor 324 is connected to the collector of the transistor 300 as well as the gate of the transistor 312 through the resistor 328. Finally, the base of the transistor 324 is connected to ground through the resistor 330.

As those skilled in the art will appreciate, when the collector of the transistor 300 is logically high thereby causing the transistor 312 to conduct, the lock-out circuit 318 ensures that the transistor 308 does not conduct in the following manner. The voltage delivered to the base of the transistor 324 is logically low since a relatively high voltage is delivered to the base of the transistor 324 when the voltage at the collector of the transistor 300 is relatively high. Accordingly, the voltage of the base of the transistor 316, which is connected to the collector of the transistor 324, is relatively low. Accordingly, the transistor 316 is brought of conduction thereby causing the voltage at the collector of the transistor 316 to be relatively low. Since the collector of the transistor 316 is connected to the gate of the transistor 308, the voltage at the base of the transistor 308 is relatively low thereby ensuring that the transistor 308 is not conducting.

In contrast, when the collector of the transistor 300 is low, the lock-out circuit 318 ensures that the transistor 308 is brought into conduction while preventing the transistor 312 from conducting in the following manner. The voltage at the base of the transistor 324 is relatively low while the voltage at the collector of the transistor 300 is also low. This causes the voltage at the collector of the transistor 324 to be relatively high, which in turn causes the voltage at the base of the transistor 316 to be also relatively high. This causes the transistor 316 to conduct, thereby connecting the gate of the transistor 308 to $V_{cc}$. In this circumstance, the transistor 308 is able to conduct, while the transistor 312 is brought out of conduction. The resistor 310 as well as the capacitor 332 cause a slight delay in driving the transistor 308 into conduction thereby permitting transistor 312 to be brought out of conduction before the transistor 308 begins to conduct.

The operation of the automatic damper system will now be described. The output from the accelerometer 258 is delivered to the first and second comparators 278 and 282 through a filter 264 comprising the resistors 266–272, as well as the capacitors 262 and 274–276. The filter 264 rejects the output from the accelerometer 258 unless the output is substantially within the range of 0.4 Hz to 10 Hz. If the output from the filter 264 is greater than the positive acceleration threshold, the output from the first comparator 278 goes to a logical zero thereby causing the AND gate 288 to generate a logically low output. Similarly, if the output from the filter 264 is greater than negative acceleration threshold, the output from the AND gate 288 will also be logically low.

The output from the AND gate 288 is then compared with the position of the actuator 176 by means of the exclusive OR gate 290. If it is determined by the exclusive OR gate 290 that the position of the actuator 176 should be changed, the output from the exclusive OR gate becomes logically high which causes the transistor 308 to conduct which in turn causing the actuator 176 to rotate. When this occurs, the lock-out circuit 318 prevents the transistor 312 from also conducting. In contrast, if the exclusive OR gate 290 determines that the actuator 176 should not be rotated, the exclusive OR gate 290 causes the transistor 312 to conduct thereby grounding the coils of the actuator 176 so as to brake movement of the actuator 176. Again, the lock-out circuit 318 prevents the transistor 308 from conducting when the transistor 312 is conducting.

While it is apparent that the preferred embodiment illustrated above is well calculated to fulfill the objects stated, it will be appreciated that the present invention is capable of modification, variation and change without departing from the scope of the invention. For example, the electronic control module may be used for measuring the vertical velocity of the electronic control module, the output of which can then be differentiated so as to obtain a signal which is related to acceleration. Furthermore, a greater or lesser number of flow passages may be used in the orifice sleeve and shutter sleeve so as to provide greater variation in the adjustment of damping characteristics. It is also possible to provide a damper "firm" hold time circuit which will hold the damper in the firm damping position for at least 50–100 milliseconds.

In addition, various methods may be used for sensing acceleration or velocity of the piston. For example, permanent magnet may be disposed around the pressure cylinder with a coil secured to the piston so as to produce a voltage in the coil as a function of piston velocity. In addition, a permanent magnet may be located in the upper end cap with a coil located in the piston rod, the output of which is responsive to velocity. Further, permanent magnet may be located at the piston with the coil around the pressure cylinder. Further, the pressure cylinder may be coated with copper so that brush contacts on the piston could be used for measuring resistance as a function of displacement. A strain gauge may be located inside the piston rod so as to operate as a force transducer. Finally, a piezoelectric device may also be located between the piston rod and the piston which also acts as a force transducer. Accordingly, the scope of the invention is to be measured against the scope of the following claims.

What is claimed is:

1. An automatic damper system mountable in various types of automotive vehicles, said system comprising:
   (a) a plurality of dampers, each of said dampers installed between a sprung and unsprung portion of the automotive vehicle and including:
   a pressure cylinder forming a working chamber having first and second portions operable to store damping fluid,
   a first valve member disposed within said pressure cylinder having a first plurality of flow passages,
   a second valve member disposed within said pressure cylinder having a second plurality of flow passages, said second valve member being displaceable with respect to said first valve member to vary the flow of damping fluid between said first and second portions of said working chamber, and
   an actuator to displace said second valve member with respect to said first valve member;
   (b) a plurality of transmission lines, each of said transmission lines coupled to one of said dampers; and
   (c) a plurality of separate external control modules, each of said separate external control modules being fixedly secured to the automotive vehicle, each of said separate external control modules dedicated to the control of one of said dampers and being positioned on the automotive vehicle away from and off of but in close proximity to said one damper, only each of said separate external control modules are operable to control said one damper by delivering a control signal over one of said transmission lines, wherein each of said separate external control modules may be installed on the automotive vehicle at a plurality of remote locations of the automotive vehicle in close proximity to and away from said one damper to accommodate the various types of automotive vehicles.

2. The automatic damper system of claim 1, wherein each of said separate external control modules are operable to control the displacement of only one of said second valve members.

3. The automatic damper system of claim 1, wherein at least one of said separate external control modules includes an aecelerometer, said accelerometer being operable to generate an electrical signal in response to the acceleration of said one separate external control module.

4. The automatic damper system of claim 3, wherein said one separate external control module is operable to determine whether said electrical signal from said accelerometer exceeds a first threshold, said one separate external control module being operable to cause at least one of said dampers to generate firm damping characteristics when said electrical signal from said aecelerometer exceeds said first threshold.

5. The automatic damper system of claim 4, wherein said one separate external control module is operable to determine whether said electrical signal from said accelerometer exceeds a second threshold, said one separate external control module being operable to cause said one damper to generate firm damping characteristics when said electrical signal from said accelerometer exceeds said second threshold.

6. The automatic damper system of claim 5, wherein said one separate external control module further includes means for filtering said electrical signal from said accelerometer so as to reject said electrical signal when the frequency of said electrical signal is below a first frequency, said means for filtering said electrical signal from said accelerometer being further operable to reject said electrical signal when the frequency of said electrical signal is above a second frequency.

7. The automatic damper system of claim 1 wherein each of said separate external control modules is fixedly secured to a fender well of the automotive vehicle adjacent to said one damper.

8. An automatic damping system for use with various types of automotive vehicles, said system comprising:
   a plurality of dampers installed between a sprung and unsprung portion of the automotive vehicle which are operable to generate varying damping forces by controlling the flow of damping fluid between a first and a second working chamber within each of said dampers, each of said dampers including:
   (a) first valve means for establishing a flow passage between said first and second portions of said working chamber,
   (b) second valve means for restricting the flow of damping fluid through said flow passage upon movement of said second valve means,
   (c) rotational means for rotating said second valve means with respect to said first valve means, and
   (d) means for determining the rotational position of said second valve means with respect to said first valve means; and
   a plurality of separate external control modules, each of said separate external control modules fixedly secured to the automotive vehicle and dedicated to one of said dampers, each of said separate external control modules including:
   (a) an accelerometer for generating a first electrical signal in response to the displacement of said accelerometer, and
   (b) means for generating a second electrical signal in response to whether said first electrical signal is in a predetermined range, said second electrical signal being delivered to said rotational means for rotating said second valve means with respect to said first valve means, wherein only said separate external control module is operable to control said rotational means and is positioned on the automotive vehicle away from and off of but in close proximity to said damper to accommodate being mounted on various types of automotive vehicles.

9. The automatic damping system of claim 8, wherein said means for determining the rotational position of said second valve means with respect to said first valve means is operable to permit said separate external control module to determine whether said second valve means has been displaced with respect to said first valve means to one of a plurality of positions.

10. The automatic damping system of claim 9, wherein said means for determining the rotational position of said second valve means comprises a substrate having first and second encoder conductors disposed thereon, each of said encoder conductors having a circular portion and radially extending portion, said circular portion of at least one of said encoder conductors having a first and second plurality of regions, said first plurality of regions being disposed closer to the center of said circular region than said second plurality of regions.

11. The automatic damping system of claim 10, wherein said means for determining the rotational position of said second valve means with respect to said first valve means further comprises means for causing selective electrical communication between said encoder conductors upon rotation of said second valve means with respect to said first valve means.

12. The automatic damping system of claim 11, wherein said means for causing selective electrical communication between said conductors comprises a brush disk, said brush disk having a circular substrate with a conductor disposed thereon, said conductor of said brush disk including a brush portion which is disposed adjacent to said encoder conductors.

13. The automatic damping system of claim 12, wherein the width of said brush portion is sufficiently large to cause electrical communication between said first encoder conductor and said first plurality of regions of said second encoder conductor while being sufficiently narrow to avoid electrical communication between said first encoder conductor and said second plurality regions of said second encoder conductor.

14. The automatic damping system of claim 13, wherein each of said separate external control modules are operable to control the displacement of only one of said second valve means.

15. The automatic damping system of claim 14, wherein said means for generating a second electrical signal in response to whether said first electrical signal is in a predetermined range is operable to determine whether said first electrical signal substantially exceeds a first threshold, said separate external control module being operable to cause one of said dampers to generate firm damping characteristics when said first electrical signal substantially exceeds said first threshold.

16. The automatic damping system of claim 15, wherein said means for generating a second electrical signal in response to whether said first electrical signal is in a predetermined range is operable to determine whether said first electrical signal substantially exceeds a second threshold, said separate external control module being operable to cause one of said dampers to generate firm damping characteristics when said first electrical signal substantially exceeds said second threshold.

17. The automatic damping system of claim 16, wherein said means for generating a second electrical signal in response to whether said first electrical signal is in a predetermined range further includes means for filtering said first electrical signal so as to reject said first electrical signal when the frequency of said first electrical signal is substantially below a first frequency, said means for filtering said first electrical signal being further operable to reject said first electrical signal when the frequency of said first electrical signal is substantially above a second frequency.

18. An automatic multi-damper suspension system mountable within various types of automotive vehicles, said system comprising:

a plurality of dampers, each of said dampers installed between a sprung and unsprung portion of the automotive vehicle and having a controllable valve to control the flow of damping fluid between a first and a second working chamber within each of said dampers; and a plurality of separate external control modules, each of said separate external control modules fixedly secured to the automotive vehicle, each of said separate external control modules dedicated to one of said dampers and positioned away from, off of, and in close proximity to one of said dampers, only each of said separate external control modules are operable to control one of said dampers, wherein each of said separate external control modules may be installed on the automotive vehicle at a plurality of remote positions in close proximity to, off of, and away from one of said dampers to accommodate being mounted within the various types of automotive vehicles, each of said separate external control modules includes:

an accelerometer for generating a first electrical signal in response to the vertical movement of said separate external control module;

filtering means for filtering said first electrical signal to generate an output in response to said first electrical signal;

first comparator means for comparing the output of said filtering means to a first threshold value and generating an output in response thereto;

second comparator means for comparing the output of said filtering means to a second threshold value and generating an output in response thereto;

logic means for generating a second electrical signal in response to the outputs of said first and second comparators and an electrical output of said controllable valve associated with said damper;

driver means for controlling the flow of damping fluid through said controllable valve, said driver means including a first driver and a second driver operable to change the flow of damping fluid through said controllable valve in response to said second electrical signal; and lock-out means for insuring that said first driver and said second driver do not conduct simultaneously.

19. The automatic multi-damper suspension system of claim 18, wherein said filtering means is operable to cause rejection of said first electrical signal when the frequency of said first electrical signal is below a first value, said filtering means being further operable to cause rejection of said first electrical signal when the frequency of said first electrical signal is above a second value.

20. The automatic multi-damper suspension system of claim 19, wherein said first frequency is substantially equal to 0.4 Hz while said second frequency is substantially equal to 10 Hz.

21. The automatic multi-damper suspension system of claim 19, wherein said filtering means is further operable to superimpose a predetermined voltage on said first electrical signal.

22. The automatic multi-damper suspension system of claim 19, further comprising first and second variable resistors each of which are able to generate an output, said first comparator means comprises a first comparator which receives said output of said filtering means and said output of said first variable resistor, adjustment of the resistance of said first variable resistor being operable to change said first threshold value, said second comparator means comprising a second comparator which receives said output of said filtering means and said output of said second variable resistor, adjustment of the resistance of said second variable resistor being operable to change said second threshold value.

23. The automatic multi-damper suspension system of claim 18, wherein said logic means for generating a second electrical signal comprises a logic circuit operable to receive the outputs of said first and second comparator means as well as said controllable valve and generate a third electrical signal in response thereto.

24. The automatic multi-damper suspension system of claim 23, wherein said logic circuit comprises a NOR gate operable to receive the outputs of said first comparator means and said second comparator means and generate a response thereto.

25. The automatic multi-damper suspension system of claim 24, wherein said logic circuit further comprises an exclusive NOR gate operable to receive said NOR gate and the electrical output of said controllable valve.

26. The automatic multi-damper suspension system of claim 25, wherein said exclusive NOR gate outputs said second electrical signal.

27. The automatic multi-damper suspension system of claim 26, wherein said first driver comprises a first field-effect transistor having a gate, the voltage delivered to said gate of said first field-effect transistor being responsive to the output of said exclusive NOR gate and being operable to change the flow of damping fluid through said controllable valve.

28. The automatic multi-damper suspension system of claim 27, wherein said second driver comprises a second field-effect transistor having a gate, the voltage delivered to said gate of said second field-effect transistor being responsive to the output of said exclusive NOR gate and being operable to terminate changes in the flow of damping fluid through said controllable valve.

29. The automatic multi-damper suspension system of claim 28, wherein said controllable valve includes an actuator having a coil, the flow of current through the coil of said actuator being operable to regulate the flow of damping fluid through said controllable valve, the voltage delivered to the gate of said second field-effect transistor being further operable to drain residual electromotive force in said coil generated to said coil upon movement of said controllable valve.

* * * * *

UNITED STATES PATENT AND TRADEMARK OFFICE
CERTIFICATE OF CORRECTION

PATENT NO. : 5,653,315

DATED : August 5, 1997

INVENTOR(S) : Alan L. Ekquist et al

It is certified that error appears in the above-indentified patent and that said Letters Patent is hereby corrected as shown below:

Col. 2, line 19, "Shock" should be --shock--

Col. 9, line 41, delete "stroke. Of" and substitute --stroke) or-- therefor

Col. 11, line 6, "capacitor" should be --capacitors--

Col. 11, line 15, "capacitor" should be --capacitors--

Col. 13, line 14, after "base" insert --of--

Col. 14, line 44, "causing" should be --causes--

Col. 15, line 61, claim 3, "aecelerometer" should be --accelerometer--

Col. 16, line 3, claim 4, "aecelerometer" should be --accelerometer--

Signed and Sealed this

Third Day of February, 1998

Attest:

BRUCE LEHMAN

Attesting Officer

Commissioner of Patents and Trademarks